Feb. 3, 1970     I. KAUFMAN ET AL     3,493,288
LIGHT BEAM DEFLECTOR

Filed Oct. 24, 1966     2 Sheets-Sheet 1

Henry G. Oltman, Jr,
Irving Kaufman,
Uwe J. Schmidt,
INVENTORS.

BY.

*Edward Dugas*

AGENT.

Feb. 3, 1970  I. KAUFMAN ET AL  3,493,288
LIGHT BEAM DEFLECTOR
Filed Oct. 24, 1966  2 Sheets-Sheet 2
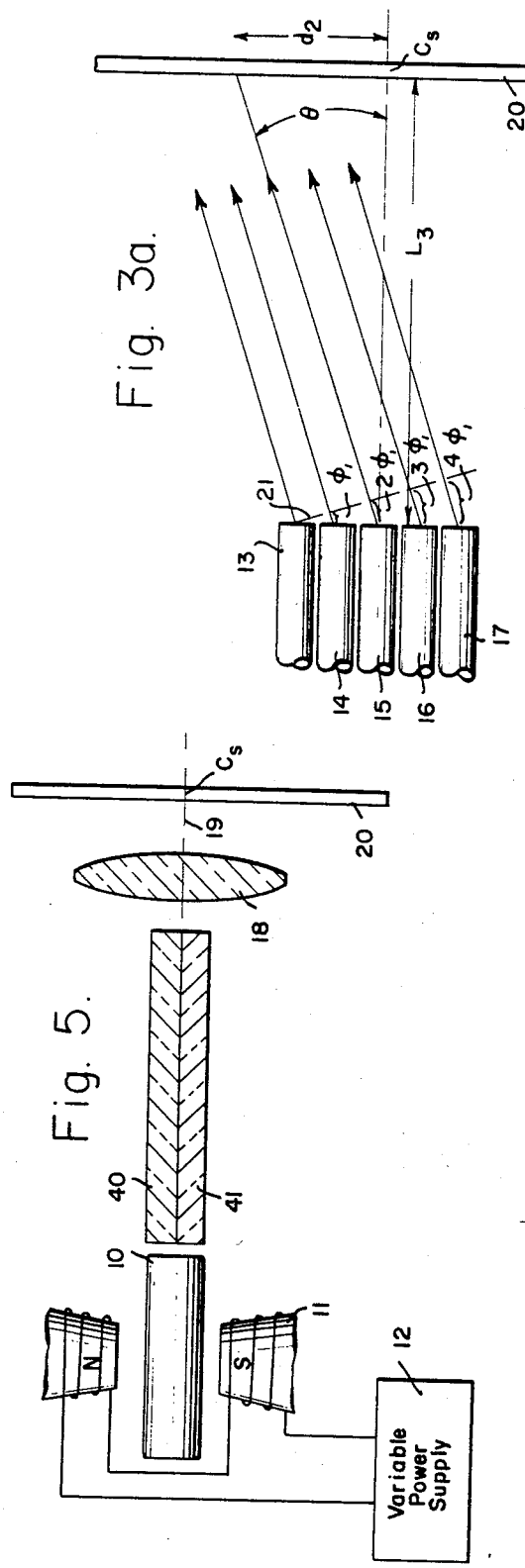
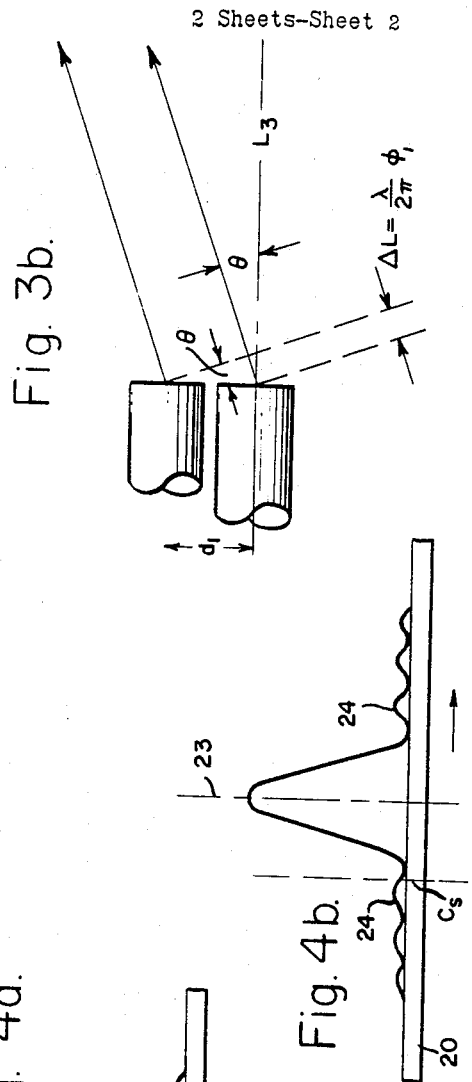
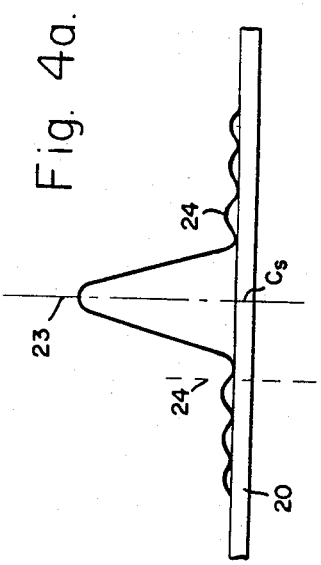

United States Patent Office 3,493,288
Patented Feb. 3, 1970

3,493,288
LIGHT BEAM DEFLECTOR
Irving Kaufman, Tempe, Ariz., Henry G. Oltman, Jr., Woodland Hills, Calif., and Uwe J. Schmidt, Pinneberg, Germany, assignors to TRW Inc., Redondo Beach, Calif., a corporation of Ohio
Filed Oct. 24, 1966, Ser. No. 588,787
Int. Cl. G02b 27/28
U.S. Cl. 350—163       7 Claims This invention relates to a light beam deflector and more specifically it relates to a deflector which shifts the position of an interference pattern.

Various means have been devised for deflecting a light beam utilizing birefringent materials such as calcite. Calcite is an uniaxial crystal having the property of displacing light rays of one polarization and not displacing light rays having an orthogonal polarization. By means of a light modulator the plane of polarization of a ray reaching the crystal may be controlled. It is thereby possible to switch the beam from one position to another simply by controlling the plane of polarization of the light modulator. A KDP-type crystal is used as the light modulator. This crystal changes its polarization characteristics when an electric field is created in the crystal. This particular type of light deflector requires no moving parts and, therefore, has great potential in the computer field where a binary electrical signal could control the deflection of the light ray between two desired points. Such a device is disclosed in the article "Digital Light Deflector" by T. J. Nelson appearing in the Bell System Technical Journal dated May 1964.

Another type of light deflector utilizing a birefringent prism is disclosed in U.S. patent application, Ser. No. 486,364 filed Sept. 10, 1965 entitled "Light Beam Deflector" by Uwe J. Schmidt, a co-inventor of the present application which is assigned to TRW Inc. In that application a polarization switch controls the plane of polarization of a light beam which is passed through the prism and deflected an amount dependent upon its initial polarization.

In the present invention, a light beam from a source is separated into at least two beams. The phase between the beams is changed by having the beams travel different path lengths. The separated beams are recombined by optical interference which can be read out or displayed as a pattern on a screen. By varying the relative phase differences between the separated beams of light the interference pattern can be shifted an amount proportional to the phase differences. This type of proportional control provides a device which is inherently analog in nature and is not restricted to digital application.

It is therefore an object of the present invention to provide a light beam deflector which utilizes the phase difference between two or more beams of light to deflect a source beam.

It is another object of this invention to provide an improved means of nonmechanically deflecting a light beam.

It is another object of this invention to provide a means of deflecting a light beam in a analog manner.

These and other objects of the present invention will become more apparent when taken in conjunction with the following description and drawings in which:

FIGURES 3a and 3b illustrates the deflection of the separated beams, as a function of phase;

FIGURES 4a and 4b are graphic illustrations of the interference pattern as its relative position is shifted; and FIGURE 5 illustrates a second embodiment of the present invention.

Figure 1:
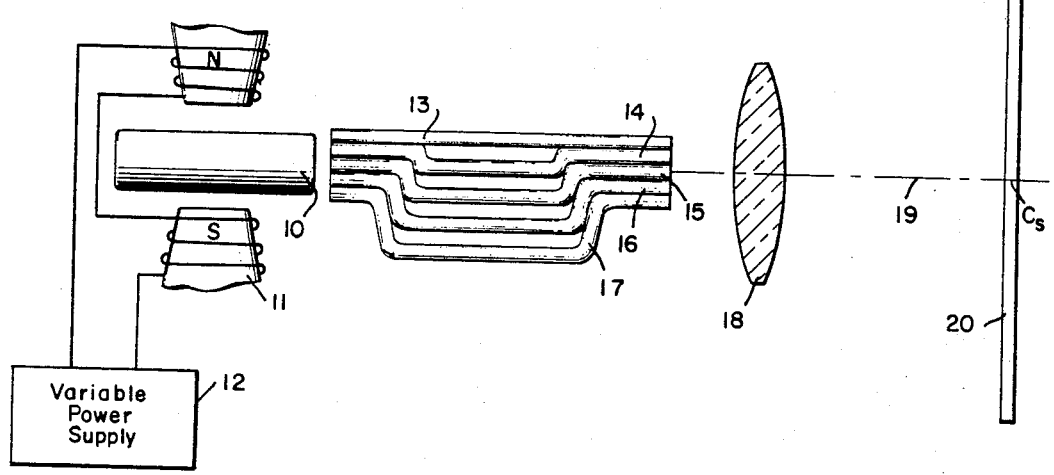
FIGURE 1 illustrates one embodiment of the present invention.

Referring to FIGURE 1, the laser 10 provides a coherent source of light. The light from the laser is separated into five separate beams by means of light pipes 13 through 17 respectively. Light pipes 13 through 17 are interposed between the light source 10 and the sceen 20 and provide five optical paths from source 10 to screen 20. These pipes may be any of the well known fiber optic types or optical wave guides of the type disclosed in "Optical Dielectric Waveguides" presented at 1961—PGMTT National Symposium, by E. Snitzer in Washington, D.C., May 15–17, 1961. The beams of light just prior to leaving the ends of pipes 13 through 17 are positioned substantially parallel.

When the beams leave the pipes they radiate in a pattern which is identical to the radiation pattern from slits or lines in a grating. Such a pattern is disclosed in "University Physics" by Sears and Zemansky, 2nd ed., published by Addison-Wesley, Inc. 1957, pp. 837 and 852. This pattern is focused onto screen 20 by lens 18. The pipes 13 through 17 are symmetrically placed with respect to line 19.

If pipes 13 through 17 were of the same length the beams leaving the ends of the pipes would be in phase and the pattern formed on screen 20 would be symmetrical about line 19 with a maximum intensity point on line 19. The pattern formed is the result of the phase summing, by interference, of the beams radiated from the ends of the pipes. Where the interfering fields are in phase a maximum intensity will be observed on the screen. Where the two beams are 180° out of phase a minimum intensity will be observed.

If the optical path length of pipe 14 is increased relative to the optical path length of pipe 13, the phase between the beams radiated from the ends of the pipes will be different and the pattern formed on screen 20 will be shifted with respect to line 19 an amount proportional to the increased length. In actual design any number of light pipes greater than one may be used. By using additional light pipes the resolution of the central maxima of the interference pattern is enhanced while the secondary maxima are reduced. Pipes 15 and 17 are graduated in length so as to provide a uniform phase difference between adjacent pipes equivalent to the phase difference between pipes 13 and 14. By varying the relative phase length of the pipes the pattern on the face of screen 20 can be made to move. It is relatively easy to change the wavelength of the laser light source 10 which effectively changes the optical phase lengths from the source to the screen.

One means of changing the wavelength of the laser is to place a magnet 11 in close proximity to the laser such that the magnetic field effectively pulls the laser off frequency. The magnetic field is controlled by the variable power supply 12. Other means such as varying the optical length of the laser resonant cavity may be used to change its wavelength. Reference S. E. Harris and Russell Targ, FM Oscillation of a He-He Laser Appl. Phys. letter, v. 5 #10, Nov. 15, 1964, p. 202.

Figure 2:
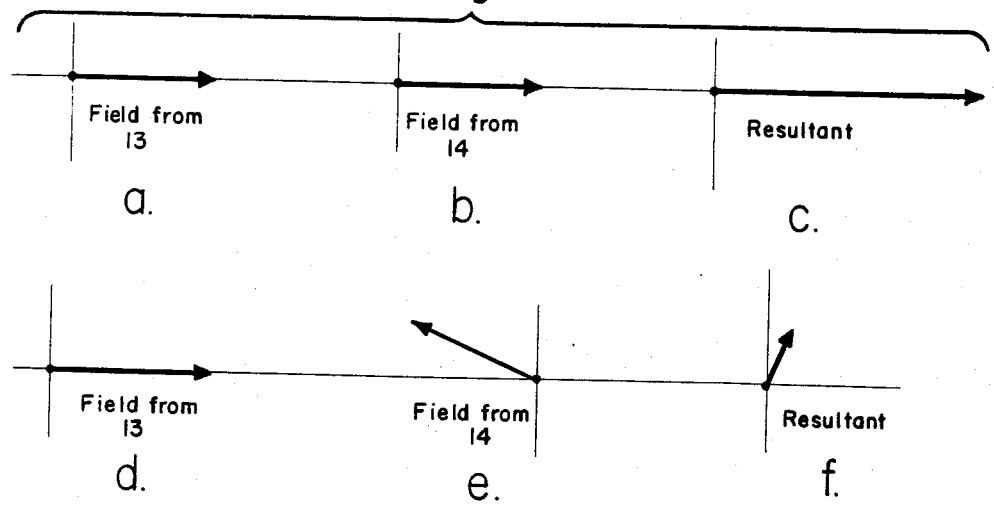
FIGURES 2a to 2f are vector illustrations of the interference pattern.

In FIGURES 2a and 2b the phase of the beams from light pipes 13 and 14 are shown as being vectorially in phase. The resultant of these two vectors is shown in FIGURE 2c. The vector sum of FIGURE 2c will appear as a bright or maximum intensity point on the screen 20. When the phase of the beam from pipe 14 is changed as shown in FIGURE 2e and the vectorially summed with the beam from pipe 13 as shown in FIGURE 2f the result is a field of decreased intensity. In actual operation the phase vectors from each light pipe is summed by interference to form the resultant vector. FIGURE 2 is reduced to only two beams for the purpose of simplicity.

In FIGURES 3a and 3b the beams from each of the light pipes is shown deflected by an angle $\theta$ causing an image of the type shown in FIGURE 3a to form a distance $d_2$ from the center $C_S$ of the screen. The angle $\theta$ is a function of the distance $d$, between the centers of the light pipes, the source wavelength and the phase shift caused by the difference $\Delta L$ in length of the optical pipes. Line 21 is a phase front line; along this line the phase from each of the light pipes is equal. The symbols $\phi_1$ to $4\phi_1$ indicate the equally graduated phase increases of the beams emitted by light pipes 13 and 17 respectively. This phase difference as previously indicated being created by the successive increase in the lengths of the light pipes. The phase shift $\phi_1$ between pipes 13 and 14 can be defined by:

$$\phi_1 = \frac{2\pi}{\lambda}[L_2 - L_1] = \frac{2\pi}{\lambda}[\Delta L]$$

where $L_1$ and $L_2$ is the length of light pipes 13 and 14 respectively; and $\lambda$ is the wavelength of the light source 10. The phase shift between light pipes 14 and 15 will be $2\phi_1$, and between 15 and 16 it will be $3\phi_1$ and between 16 and 17 it will be $4\phi_1$. The change in phase $\Delta\phi_1$ for shift in wavelength of the laser source is defined by $$\Delta\phi_1 \simeq -\frac{2\pi}{\lambda}[L_2 - L_1]\frac{\Delta\lambda}{\lambda} = -\phi_1 \frac{\Delta\lambda}{\lambda}$$

Lens 18 and its effect upon the bending and focusing of the beams is not shown in this figure for purposes of clarity. The operation of lens 18 is well known in the art and may be obtained from reference texts on optics.

FIGURES 4a and 4b illustrate the entire pattern as it appears on the surface of the screen. The vertical axis depicts intensity and the horizontal axis depicts the surface of the screen with $C_S$ as the relative center of the screen. Line 23 indicates the primary maximum intensity point of the pattern and points 24 correspond to secondary maximum intensity points. If only two light pipes are used the secondary maximum points have almost the same amplitudes as the primary maximum point making it difficult to electronically identify the primary maximum. Increasing the number of light pipes decreases the amplitude of the secondary maximums while increasing the primary maximum.

In FIGURE 4a the primary maximum point is shown coinciding with the center of the screen point $C_S$. This condition will only occur when all the beams from the light pipes are in phase.

In FIGURE 4b the primary maximum point is shown displaced to the right an amount proportional to the phases of the beams emitted from the pipes.

Referring now to FIGURE 5, the light pipe 40 is made of a material having an index of refraction differing from the index of refraction of light pipe 41. Because the velocity of light varies in materials having different indexes of refraction it is not necessary to have different lengths of light pipes. The laser source 10, magnet 11, variable power supply 12, screen 20 and lens 18 remain the same as those in FIGURE 1.

The phase difference $\phi_2$ caused by the differences in the index of refraction are defined by:

$$\phi_2 = \frac{2\pi L_T}{\lambda}[n_1 - n_2]$$

where $L_T$ is the length of pipes 40 and 41, and $n_1$ and $n_2$ is the index of refraction of pipes 40 and 41 respectively.

This change in phase $\Delta\phi_2$ for shift in wavelength of the laser source is defined by:

$$\Delta\phi_2 \simeq -\frac{2\pi L_T}{\lambda}[n_1 - n_2]\frac{\Delta\lambda}{\lambda} = -\phi_2 \frac{\Delta\lambda}{\lambda}$$

The differences in index of refraction may be produced by using two different materials, or by using two sets of optical waveguides. These two sets of optical guides are constructed so that they transmit in different modes. The modes differ in phase velocity and, therefore, in effective index of refraction.

While there has been shown what are considered to be the preferred embodiments of the invention, it will be manifest that many changes and modifications may be made therein without departing from the essential spirit of the invention.

We claim:
1. A light beam deflecting system comprising:
 (a) a light source for producing a substantially monochromatic coherent beam of light;
 (b) means for receiving said monochromatic beam of light;
 (c) optical means interposed between said light source and said means for receiving for focusing said monochromatic beam of light on said means for receiving;
 (d) means interposed between said light source and said optical means for separating by wavefront splitting said monochromatic beam of light into a plurality of individual beams, and for causing each of said individual beams of light to travel through an effective optical path having a length different from that through which the other individual beams of light travel, thereby to create an interference pattern on said means for receiving; and
 (e) means coupled to said light source for varying the frequency of said monochromatic beam of light whereby the phase shift between individual beams of light is varied so as to deflect the light beam projected by said optical means.

2. A system as defined in claim 1 wherein said interposed means includes a plurality of light guides for causing each individual beam passing through one of said guides to have an optical path length different from that of the other individual light beams.

3. A system as defined in claim 1 wherein said interposed means includes a plurality of light guides, each for passing one of said individual beams, each of said light guides having a different index of refraction so that the effective optical path length of each of said individual beams is different from that of the other beams.

4. A system as defined in claim 2 wherein said light guides consist of transparent light pipes, each having a different length.

5. A system as defined in claim 3 wherein said light guides consist of light pipes each having a different index of refraction.

6. A system as defined in claim 1 wherein said different effective optical path lengths are so arranged as to form an interference pattern on said means for receiving, providing substantially a single intense spot of light.

7. A system as defined in claim 1 wherein said light source is a laser and wherein said means coupled to said light source provides a variable magnetic field for varying the frequency of said monochromatic beam of light.

References Cited

UNITED STATES PATENTS

| | | | |
|---|---|---|---|
| 3,171,881 | 3/1965 | Morokuma. | |
| 3,232,165 | 2/1966 | Dupuy et al. | |
| 3,277,396 | 10/1966 | Statz et al. | 331—94.5 |
| 3,312,905 | 4/1967 | Lewis | 331—94.5 X |
| 3,331,651 | 7/1967 | Sterzer | 350—96 X |
| 1,709,809 | 4/1929 | Rashevsky | 356—106 X |

OTHER REFERENCES

Brown, E. B., Modern Optics, Reinhold Publishing Corp., New York, Copyright 1965, QC355B8. Copy in Gp. 259, pp. 4 and 5.

DAVID SCHONBERG, Primary Examiner

T. H. KUSMER, Assistant Examiner

U.S. Cl. X.R.

350—96; 356—111